United States Patent [19]
Thorne et al.

[11] Patent Number: 5,329,726
[45] Date of Patent: Jul. 19, 1994

[54] SYSTEM FOR TERMITE DETECTION AND CONTROL

[76] Inventors: Barbara L. Thorne, 6801 Wells Pkwy., University Park, Md. 20782; James F. A. Traniello, 11 Smith Ave., Lexington, Mass. 02173

[21] Appl. No.: 941,460
[22] Filed: Sep. 8, 1992
[51] Int. Cl.[5] .............................................. A01M 1/00
[52] U.S. Cl. ........................................ 43/124; 43/131
[58] Field of Search ....................... 43/124, 131, 132.1

[56] References Cited

U.S. PATENT DOCUMENTS

| | | | |
|---|---|---|---|
| 1,013,514 | 1/1912 | Rand | 43/131 |
| 2,837,861 | 6/1958 | Graham, Sr. | 43/131 |
| 3,017,717 | 1/1962 | Caubre | 43/131 |
| 3,940,875 | 3/1976 | Basile | 43/124 |
| 4,945,673 | 8/1990 | Lavell | 43/124 |

OTHER PUBLICATIONS

Patent Abstracts of Japan—Abstract vol. 14,118, Published Mar. 6, 1990.

*Primary Examiner*—P. Austin Bradley
*Assistant Examiner*—Chuck Y. Mah
*Attorney, Agent, or Firm*—Mark P. Stone

[57] ABSTRACT

A system for termite detection and control is provided by a subterranean bait station having a perforated outer housing permanently implanted in the terrain below ground level, and a perforated cartridge removably received within the housing. The openings in the housing and the cartridge are in alignment with each other when the cartridge is fully received within the housing in its operational position. The cartridge received within the housing will initially contain a non-toxic bait material for diagnosing or assessing the level of a termite infestation; the bait cartridge is periodically removed from the housing to inspect for termite activity. If termite activity is detected, the non-toxic bait cartridge is replaced in the housing with a correspondingly perforated pesticide-containing bait cartridge for extermination of termites. Removal, replacement and substitution of the non-toxic and pesticide containing cartridges does not disturb pre-existing termite foraging galleries as a result of the precise alignment of the openings of the housing and the removable, exchangeable cartridges. The system may also be used for above-ground termite detection and control by externally mounting an appropriately modified housing to an outer surface of any article to be monitored, such as a timber.

35 Claims, 4 Drawing Sheets

SYSTEM FOR TERMITE DETECTION AND CONTROL

BACKGROUND OF THE INVENTION

The destructive nature of species of termites which ingest the wood of structures and other construction materials is well known. The presence of termites and their onset of destructive activity is generally difficult to detect and control since termites are subterranean and forage cryptically, and destruction occurs internally within wooden structures and provides no external signs of damage until termite infestation is at a relatively advanced stage.

Current conventional control procedures for subterranean termites involve digging a trench around a structure to be protected, depositing a pesticide within the trench, and pressure injecting pesticides. Applications are also made from the inside of structures by drilling holes in slab floors and footings and injecting termiticides. Such treatments are only prophylactic; their goal is to provide a continuous chemical barrier between the structure and the termite colony in the soil. This procedure has several disadvantages. No means are provided for monitoring termite activity prior to depositing a pesticide within the soil, so the efficacy of the control procedure cannot be assessed. Additionally, the pesticide is deposited around a structure, often without knowledge of which areas are most at risk for infestation. It is extremely difficult to achieve a complete or uniform chemical barrier around the perimeter and beneath a building, rendering the structure vulnerable to termites which find breaches in the application. Once the pesticide is applied to the soil, it cannot be removed. Finally, the termite colony likely remains viable foraging on food sources outside of the chemical barrier, thus poised to reinfest upon degradation of any portion of the chemical treatment.

Drywood termites, which nest within the wooden structures they ingest, are likewise difficult to control. The currently dominant method of remedial control involves fumigation, or tightly tenting the entire structure and pumping in lethal concentrations of methyl bromide or Vikane gases. Preventive measures include using a chemically treated wood in the original construction; applying chemical "paints" (preservatives or pesticides) or other finishes to seal and protect cracks within wooden structures; or depositing a pesticide directly into wooden structures through holes drilled for the purpose of internally applying the pesticide. These known methods provide no means for readily detecting a termite infestation.

It is the primary object of the present invention to provide an improved system for diagnosing and monitoring termite activity, determining the extent of an infestation, and and thereafter controlling termite infestation if termite activity is detected. The improved system, in its preferred embodiment, eliminates the disadvantages of the known methods discussed above by providing means for detection of termite activity before a pesticide is applied, and thereafter applying a removable pesticide to only localized control stations. The detection and control of termite activity is accomplished without disturbing the pre-existing environment of a termite colony to assure continued access of termites to the bait station. Other objects and advantages of the present invention will become apparent from the following description thereof.

SUMMARY OF THE INVENTION

The present invention provides an improved system for both detecting termite activity in a target area, and thereafter suppressing termite infestation. A perforated housing is permanently implanted in the targeted terrain at or below ground level, and a perforated non-toxic bait cartridge is removably received within the housing. The openings in the housing and the bait cartridge are oriented such that the respective openings are in alignment with each other when the cartridge is fully received within the housing in its operational position. The bait cartridge includes a highly preferred termite food, which encourages feeding and thus reveals the presence of subterranean termites which will forage and burrow into the cartridge through the aligned openings in the cartridge and the housing. Each cartridge has an internal wick, preferably augmented by a refillable water reservoir, to provide continuous slow-release moisture to the bait formulation. Preferably, the bait cartridge is at least in part transparent, and will be periodically removed from the housing to inspect for termite presence or activity. If no termite activity is detected, the bait cartridge is replaced within the housing to again be monitored at some time in the future. Once termite activity is detected at the monitoring stations, pesticide containing bait cartridges are substituted for the non-toxic bait cartridges within each housing. The pesticide containing cartridge includes openings corresponding to the openings in the bait cartridge, and thus the openings in the pesticide containing cartridge will also be aligned with the openings in the housing when the pesticide containing cartridge is substituted for the non-toxic bait cartridge. The substitution of the pesticide containing cartridge for the non-toxic cartridge will not disturb pre-existing galleries or passageways established by termites to provide access between the termite colony and the openings in the outer housing of the control station because the outer housing remains fixed relative to the terrain and the openings in the pesticide cartridge remain in alignment with the openings in the housing. Accordingly, termites are provided with continued access to the pesticide-containing bait cartridge within the housing, thus permitting continuous feeding and the transport of pesticide-containing food to the termite colony through the pre-established connections between the colony and the bait stations. It is known that food is shared within termite colonies through regurgitation with nestmates.

The system described above permits diagnosing and monitoring termite activity by inducing the foraging termites of a colony to direct foraging towards and utilize food from localized stations. The galleries or passageways established between a termite colony and the bait station are thereafter employed to provide the colony with access to a toxic bait provided at the station. The pesticide is applied only after termite activity is detected, and then is only removably deposited in a localized and controlled station within the target area. Since the bait and pesticide agents are applied to the control station by removable cartridges, expended cartridges may be easily replaced with fresh cartridges without disturbing the surrounding environment, in a manner similar to the above described substitution of the pesticide containing cartridge for the non-toxic cartridge.

In a further aspect of the invention, a perforated outer housing may be mounted directly to an external surface of a wooden structure to be monitored and/or treated. In this embodiment of the invention, only the surface of the housing in contact with the external surface of the wooden structure is perforated, since termites can only enter the housing through the housing surface adjacent to the wood surface to which the housing is mounted. The housing is adapted to receive non-toxic bait and pesticide containing cartridges having openings which are oriented to be in alignment with the openings in the contact surface of the housing when a cartridge is fully received in the housing in its operational position. The housing is fixedly mounted to the external surface of the wooden structure, the cartridges are removably received within the housing, and the operation of this embodiment of the invention to monitor and control termite activity is identical to that discussed above with respect to the subterranean monitoring and control stations.

The embodiments of the present invention provide improved and efficient methods, systems and devices for monitoring termite activity within a predetermined target area, detection of termite activity, and control of any detected termite activity. The monitoring and detection procedure in accordance with the present invention is both more efficient and safer than methods currently used for termite detection and control.

BRIEF DESCRIPTION OF THE DRAWINGS

FIG. 1b illustrates an exploded perspective view of one embodiment of a removable cartridge receivable within the housing illustrated by FIG. 1a;

FIG. 2b is a perspective view of a removable cartridge receivable within the housing illustrated by FIG. 2a;

DESCRIPTION OF THE BEST MODES FOR CARRYING OUT THE INVENTION

The present invention provides improved methods, devices and systems for both detecting the presence of termites, and for controlling termite activity upon detection. The invention capitalizes upon the instinctive behavior of termites for its effective operation. Subterranean termites, which typically dwell in the soil often form large colonies. Members of the colony forage for food and thus burrow galleries or passageways in the soil outwardly from the nest. Portions of the food located by the foraging termites are returned to the nest. Termites are known to possess means for communicating the location of a food source to other termites within the colony. Subterranean termites also share food with other colony members that have not fed directly at the food. The aforementioned behavior characteristics of termites within a colony are used by the methods and apparatus of the present invention to effectively diagnose and control subterranean termite infestations.

Figure 1A:
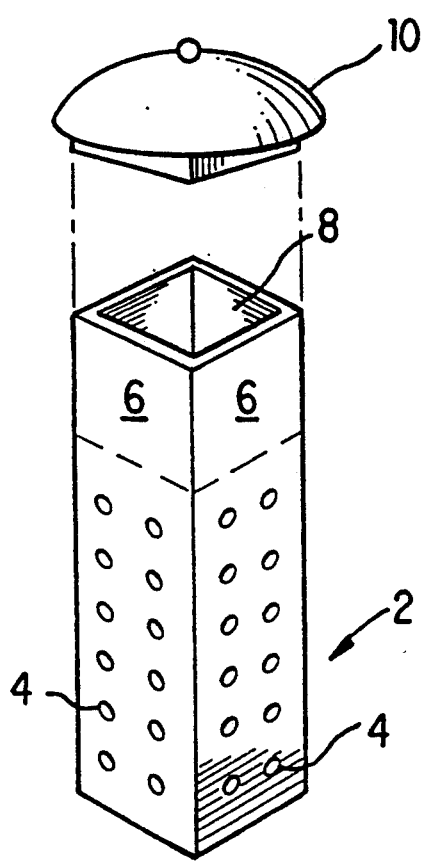
FIG. 1a illustrates an exploded perspective view of one embodiment of a fixed outer housing of a subterranean termite monitoring and control station in accordance with the present invention.
Figure 1B:
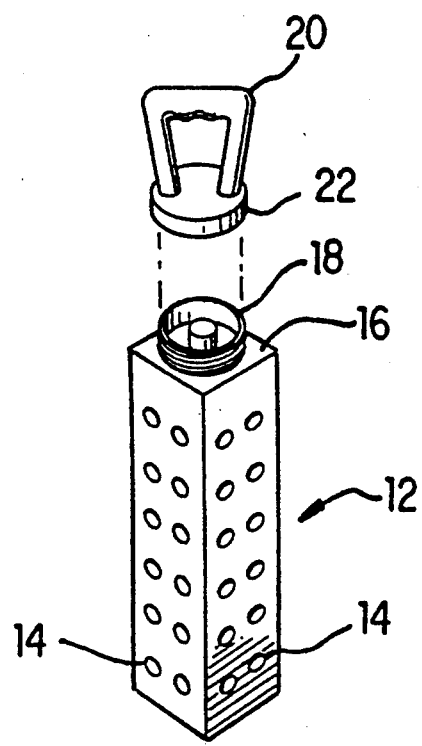

FIGS. 1a and 1b illustrate an exploded view of the components of termite monitoring and control station in accordance with one embodiment of the present invention. A substantially hollow rectangular shaped housing generally illustrated by reference numeral 2 defines a plurality of apertures 4 on portions of each outer side surface of the housing. Preferably, the housing is formed from a durable, corrosion resistant material, as for example, an acrylic or high strength plastic. The upper portions 6 of each side of the housing are imperforate, and the top surface 8 of the housing is opened. A cap 10 is removably received on the top surface 8 to close the housing 2.

Referring now to FIG. 1b, a cartridge designated generally by the reference numeral 12 is configured as a solid rectangle to complement the configuration of the housing 2. The cartridge defines a plurality of openings 14 on each of its outer surfaces which, as will be discussed in further detail below, are aligned with the corresponding openings 4 on the housing 2 when the cartridge 12 is received in an operational position within the housing 2. The outer width of the cartridge 12 is slightly less than the inner width of the housing 2 so that the cartridge may be removably received in a snug fitting relationship within the housing. A circular threaded flange 18 extends upwardly from the top surface 16 of the cartridge, and a handle 20 having a complementary threaded base portion 22 is removably securable to the flange 18 by complementary screw threads. Preferably, the length of the cartridge 12 when the handle 20 is mounted to the top thereof is less than the length of the housing 2 so that the cartridge and the handle can be received within the housing in a manner which will not interfere with placement of the cap 10 to cover the top surface of the housing 2. Preferably, for reasons which will be more fully discussed below, the cartridge is transparent (or at least partially transparent).

Figure 2C:
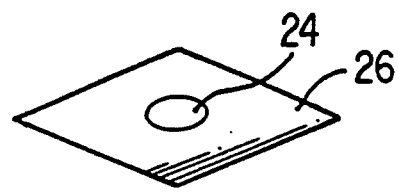
FIG. 2c is a sectional view of the cartridge illustrated by FIG. 2b.
Figure 2A:
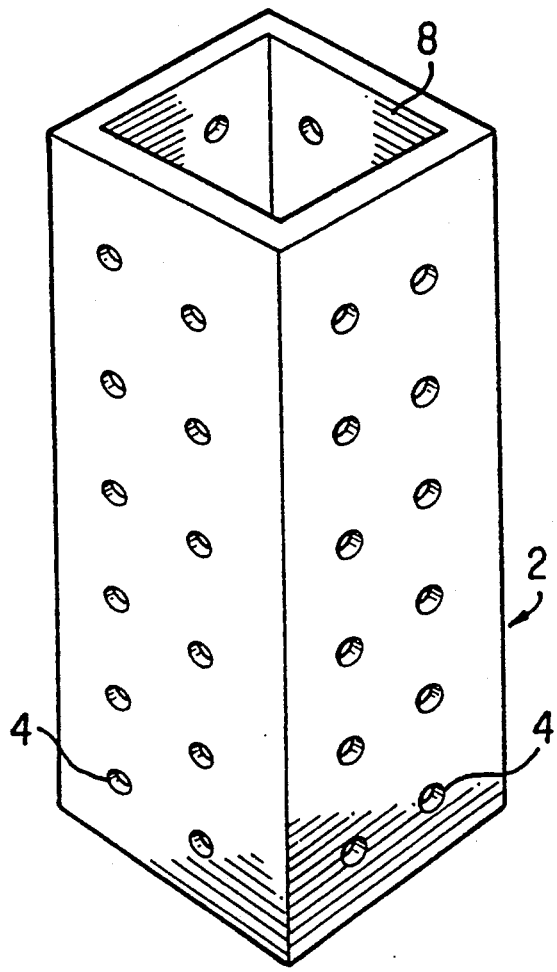
FIG. 2a is a perspective view of a further embodiment of a housing for a subterranean termite monitoring and control station in accordance with the present invention.
Figure 2B:
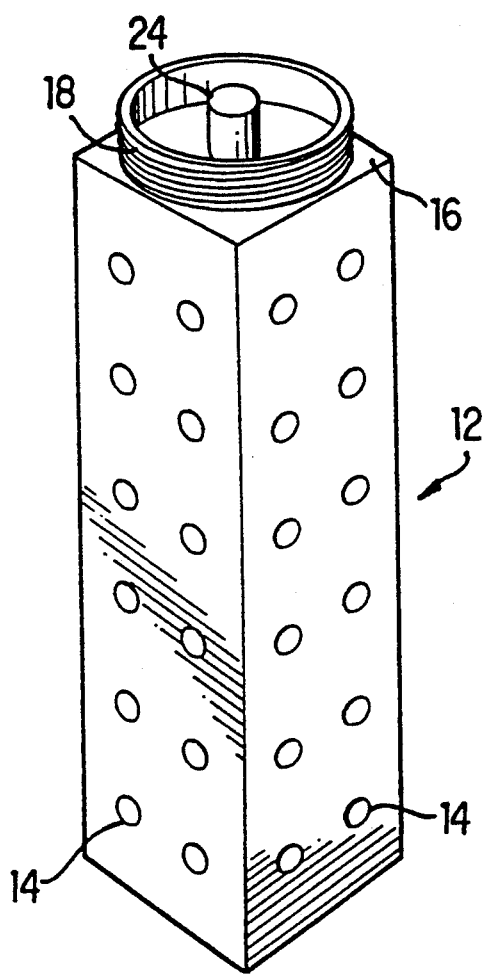

FIGS. 2a–2c illustrate a second embodiment of the invention similar to the embodiment previously discussed with respect to FIGS. 1a–1b. The same reference numerals have been used to designate common components corresponding to the first embodiment. The basic difference between the two embodiments is that the housing 2 of the second embodiment does not include sides having imperforate top portions but the openings 4 are distributed throughout the length of each side of the housing. The height of the housing corresponds to the height of the cartridge 12, and the handle 20 extending upwardly from the top surface of the cartridge (See FIG. 1b) will be received within a hollow portion of the cap 10 (See FIG. 1a) covering the opened top surface of the housing 2. As discussed with respect to FIGS. 1a and 1b, the housing and the cartridge are formed in the same geometrical configuration and are of cross-sectional dimensions which permit the cartridge to be removably received within the housing in close fitting relation therewith. The openings 4 in the housing and the openings 14 in the cartridge are oriented such that the respective openings are in alignment when the cartridge is fully received within the housing in its operational position, i.e., the base of the cartridge supported by the base of the housing.

FIG. 2c illustrates a section taken through the cartridge 12. The cartridge consists of a chemical composition 26 and a centrally disposed wick 24 extending longitudinally through the cartridge. The wick is provided for retaining or adding moisture to the cartridge, and a refillable water reservoir (not shown) may also be provided to augment the wick.

The structure illustrated in FIGS. 1 and 2 of the drawing is employed to provide a station for monitoring and controlling subterranean termite activity. The housing 2 is fixedly implanted in the terrain of a target area to be monitored. The top surface of the housing 2 (or the top of the cap 10 when the cap is used to cover the housing) is substantially even with ground level of the terrain. However, the housing may also be implanted in the soil so that a small portion of its top extends above ground level to provide for easy identification of the location in which the housing is implanted. In this arrangement, the unperforated top portion 6 of the housing illustrated by FIG. 1a will extend above the ground, thereby providing a barrier to prevent surrounding soil from falling into the housing. When the housing is implanted totally beneath ground level, the cap 10 will shield the interior of the housing from surrounding soil.

Once the housing is implanted in a preselected location in the soil, a transparent bait cartridge is inserted within the housing. This bait cartridge comprises a non-toxic bait material designed to determine if termites are present in a target area surrounding the housing. The presently preferred bait material comprises a composition formed from an agar mixture (or other suitable nutrient binding medium), processed decayed birch, uric acid, and water. Other termite preferred foods or attractants may also be used in connection with the present invention. If termites are present within the area surrounding the cartridge, foraging termites find the bait attractive. They will construct galleries or passageways from their nest to the cartridge, thus establishing a network between the colony and the bait cartridge.

The aligned openings 4 and 14 in the housing 2 and the cartridge 12 (when the cartridge is received within the housing) provide foraging termites with access to the cartridge. The cartridge is periodically removed from the housing, which remains fixedly implanted within the soil, for inspection to diagnose and monitor termite activity and presence. As noted, the bait cartridge is preferably transparent so that termite presence therein is readily observed upon removal of the cartridge from the housing. If no termite activity is observed in the cartridge, the same cartridge (or a fresh diagnostic bait cartridge) is returned into the housing for subsequent inspection at a future date. However, if termite activity is observed, pesticide containing bait cartridges are substituted in each housing within the monitoring system for the non-toxic bait cartridges. The pesticide containing cartridge is identical in structure to the non-toxic bait cartridge, and thus the openings 14 in the pesticide containing cartridge are also aligned with the openings 4 in the housing to provide subterranean termites with access to the pesticide through the housing. As used herein, the term pesticide is intended to include insecticides, insect growth regulators, biological pathogens, and other agents for exterminating living pests including insects.

It is significant to note that the removal and replacement of cartridges within the housing does not disturb the pre-existing netwrk of access galleries or passageways previously established between the termite colony or nest and the access openings 4 in the housing since the housing is not displaced during removal and substitution of the cartridges. Thus, communication and access between the pesticide containing cartridge and the termite colony is immediately established upon substitution of the pesticide containing cartridge for the non-toxic bait cartridge. Foraging termites ingest the pesticide-containing food and also return portions of the toxic food to the nest through the pre-existing network of passageways. The pesticide is preferably of the delayed-action type, or an insect growth regulator, pathogen or metabolic inhibitor. Preferably, it comprises the previously described non-toxic bait composition to which the pesticide hydramethylnon is added in the present formulation. Other termite pesticide compositions, may also be used in connection with the present invention.

It is apparent that the system described above monitors subterranean termite presence and activity in a target area, and further provides for efficient control of termite infestation if termite activity is detected. The system safely assures that pesticide is only applied to localized target areas in the terrain, and only after the existence of termite activity has been confirmed. Thus, indiscriminate application of pesticide to widespread regions of terrain is eliminated by the present invention. Moreover, the pesticide, which is applied in cartridge form, is safe to handle, may be completely removed from the terrain, and is easy to dispose. The system further provides means for easily removing a used bait or pesticide containing cartridge within the housing, and replacing the expended cartridge with a fresh cartridge of the same type. In essence, this procedure directs pesticide to the colony to safely suppress termite foraging.

Although not shown in the drawing, other modifications of the disclosed structure may be made. For example, ports may be provided on the cartridge top 20 (FIG. 1b) to provide easy access to the cartridge wick 24 for rehydrating the wick. The cartridge may also be provided with internal or external flanges extending from the openings 14 to provide further guidance for termites into the cartridge. The cartridge may also define spaces for termites to nest therein. The cap 10 for the housing or the top 20 for the cartridge may be provided with support means for upwardly extending identification markers to easily locate the monitoring and control stations after they are implanted into the soil.

Although the preferred embodiment of the invention employs separate bait and pesticide containing cartridges which are successively received within the housing, a single cartridge having a core comprising a pesticide surrounded by a non-toxic bait material may also be used. In this later modification, although the pesticide is applied to the terrain before termite activity is detected, it is applied in a localized, confined and controlled manner. Moreover, the outer non-toxic bait material surrounding the pesticide shields the pesticide from exposure until termites have burrowed through the outer layer and into the pesticide.

Figure 3A:
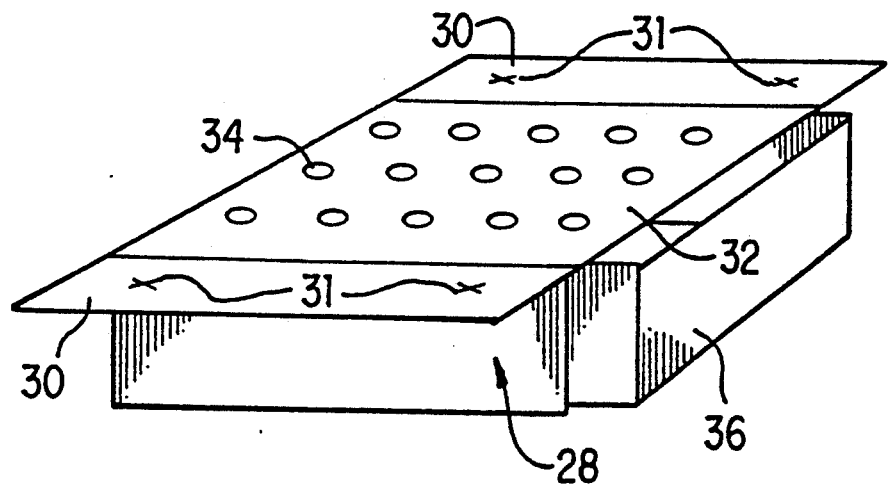
FIG. 3a is a perspective view of an embodiment of the invention useful for above-ground monitoring and control of termite activity.

FIG. 3a illustrates a third embodiment of the invention which is intended to diagnose, monitor and control termite activity above the ground and within wooden structures. It is known that wood ingesting termites nest internally within the structure in which they are devouring. As illustrated by FIG. 3a, a housing 28 is fixedly mounted relative to a portion of an outer surface of a wooden timber (not shown) by conventional mounting means, as for example, by a pair of opposed flanges 30 having mounting openings 31 extending laterally outwardly from a front surface 32 of the housing. Unlike the housings 2 and 12 of the previously discussed embodiments, only the front surface 32 of the housing 28 defines apertures 34, and the remaining surfaces of the housing are imperforate. The housing is mounted to a timber such that the perforated housing surface 32 is in contact with an adjacent external surface of the timber. In the present embodiment, it is only necessary that one side of the housing be perforated because, unlike the previous embodiments in which the housing is implanted within the terrain and termites have access to all sides thereof, termites in a timber have access to the housing only through the single housing surface directly in contact with the timber.

A cartridge 36 formed in the same geometrical configuration as the housing, but smaller in width, is removably received in close fitting relationship within the housing. A plurality of openings defined on the side of the cartridge adjacent to the front surface 32 of the housing are oriented to be in alignment with the openings 34 in the housing when the cartridge is received within the housing in its operational position.

The operation of the FIG. 3a embodiment of the invention is similar to that described with respect to the earlier discussed embodiments. A bait cartridge for attracting termites is initially inserted into the housing, and is periodically removed for visual inspection and detection of termite activity. Preferably, the bait cartridge is transparent to more readily detect termite presence by a simple visual inspection. If termite activity is detected, a pesticide containing cartridge, which corresponds identically in structure to the bait cartridge, is substituted for the bait cartridge and inserted in the housing. The position of the housing remains fixed relative to the timber during replacement or substitution of cartridges, and pre-existing galleries or passageways established by the termites between their nest and the housing remain intact and undisturbed. The termites subsequently have access to and are exposed to the pesticide containing cartridge, portions of which are returned to the nest by foraging termites through the pre-existing network of passageways.

The advantages of the FIG. 3a embodiment, which are similar to the advantages exhibited by the previously discussed embodiments, enable predetermined structures to be monitored for termite activity, thus providing means for detecting termite presence. The pesticide is not applied until termite presence is detected, and thereafter the pesticide is applied in a controlled manner and only to a localized target area. The pesticide is applied as a cartridge and therefore may be safely stored, applied, and disposed. As discussed with respect to the earlier described embodiments, a single cartridge including a toxic core surrounded by a non-toxic bait material may be employed instead of two separate, exchangeable cartridges.

Figure 3B:
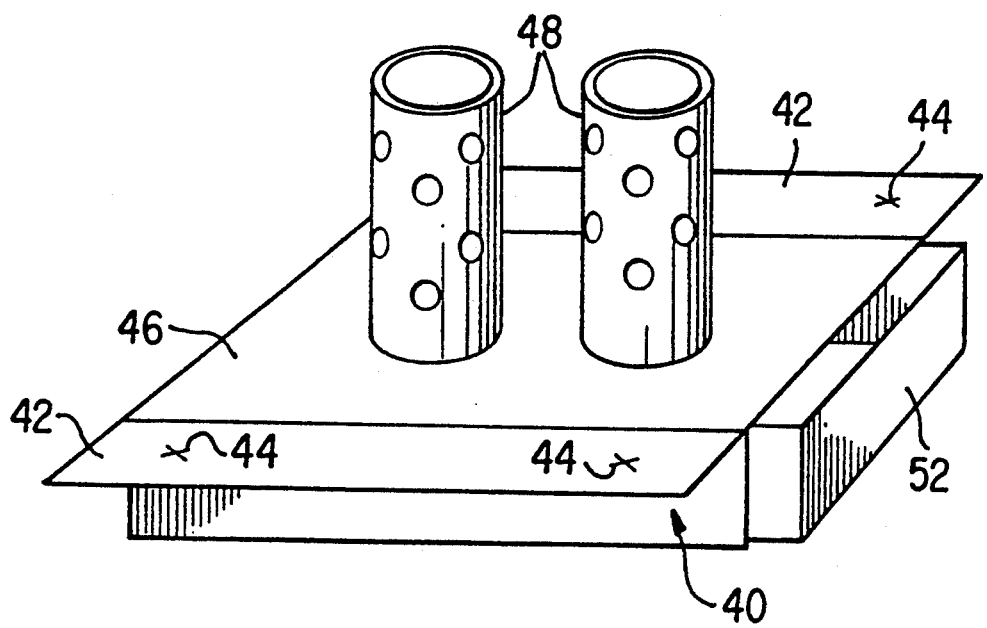
FIG. 3b is a perspective view of a further embodiment of the invention useful for above-ground monitoring and control of termite activity.

FIG. 3b is a further embodiment of a termite monitoring and control system applied to an external surface of a wooden article, in accordance with the present invention. A housing 40 includes opposed, laterally extending flanges 42 each having openings 44 for mounting the housing to a portion of an outer surface of a wooden article to the monitored, such as a timber. A front contact surface 46 of the housing abuts against the outer surface of the wooden article in the operational position of the system. A pair of cylinders 48 extend transversely outwardly from the front contact surface 46 of the housing. Each cylinder 48 defines a plurality of openings 50 on its respective sidewall. The cylinders contain a bait material for attracting termites to enter the openings 50. The bait containing cylinders 48 are in communication with a removable cartridge 52 inserted into the housing.

In operation of the above embodiment, openings corresponding to the cross-sectional dimensions of the respective cylinders are drilled into a surface of the wooden article to be treated. Thereafter, the housing 40 is oriented relative to the wooden article such that the cylinders 48 are received within the drilled openings, and the front surface of the housing is thereafter mounted flush against the outer surface of the article by means of the flanges 42. Termites within the article being treated enter the cylinders 48 through the openings therein, and thereafter enter the cartridge 50 containing further bait material. The bait cartridge, which is preferably transparent, is periodically removed from the housing to inspect for termite activity. If termite activity is detected, the bait cartridge is replaced with a pesticide containing cartridge which is removably received within the housing 40.

The embodiment of the invention disclosed by FIG. 3b is advantageous in that pesticide is applied to the system only after termite activity has been detected, and it is then applied only in a controlled and localized manner. Termites within an infested timber are induced out of the timber.

The preferred embodiments of the invention discussed herein employ a two stage termite monitoring and control system in which a first bait cartridge for detecting termite presence is replaced with a second pesticide containing cartridge only after termite activity has been confirmed. As also discussed, it is within the scope of the present invention to employ a single cartridge formed from a central core of pesticide containing material surrounded by an outer layer of non-toxic bait material. In this manner, both detection and control of termite activity may be accomplished using a single combined cartridge. In this modification, although the pesticide containing material is initially received within the housing before any termite activity is detected, it nonetheless is not exposed until termites are present and have burrowed through the outer bait material. Other than the use of a combined bait/pesticide containing cartridge, this modified embodiment of the invention operates along the same principles as discussed with respect to the earlier disclosed embodiments.

Figure 4:
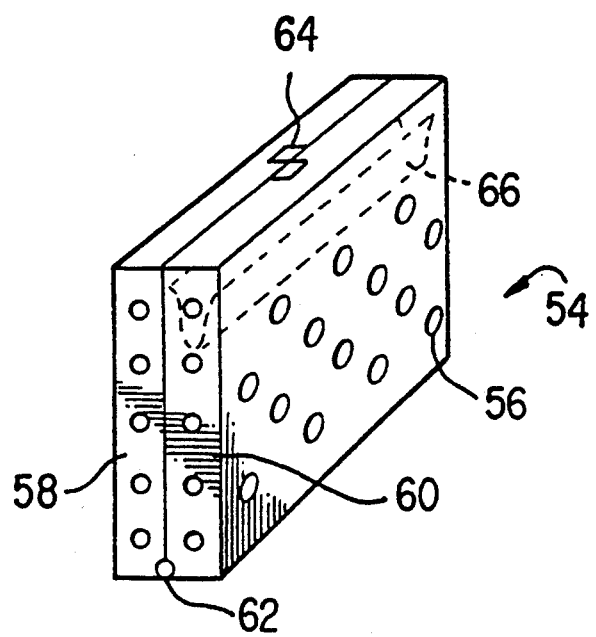
FIG. 4 is a perspective view of a further embodiment of a housing for monitoring and controlling termite activity in accordance with the present invention.

FIG. 4 of the drawings illustrates a further embodiment of the system of the present invention. A bait cartridge of the type discussed above is received within an apertured inner housing 54 defining a plurality of apertures 56 on one or more outer surfaces thereof. The inner housing is formed from two hinged pieces 58 and 60 joined by an internal hinge 62 provided at the bottom of the lateral ends of the inner housing. The inner housing is selectively openable and closable by pivoting the two opposed sections 58 and 60 relative to each other along the hinge 62. A pair of conventional locking clips 64 is mounted to the center of the top side of the inner housing for releasably locking the opposed housing sections together when the inner housing is closed. A bait or toxicant cartridge is removably received within the apertured inner housing, and the inner housing is itself is removably received within a permanently positioned outer housing within a bait station, in the same manner as previously discussed herein. The internal hinges mounted to the inner housing are located in positions which will not interfere with the insertion and removal of the inner housing into and out of the fixed outer housing of the bait station. A reservoir 66 may be defined in the inner housing to provide a source of water connected to a wick (See FIG. 2b) for retaining or adding moisture to the cartridge enclosed within the inner housing.

The embodiment of the invention illustrated by FIG. 4 advantageously enables direct inspection of a bait cartridge for termite consumption and occupancy, and permits thorough observation of a cartridge unimpeded by the inner housing. Cartridges may be easily removed, inspected, and exchanged through use of the selectively openable inner housing as discussed herein.

Other modifications of the disclosed termite detection and control systems are within the scope of the present invention. For example, although the housings and cartridges have been illustrated as being square or rectangular in cross section, they may be formed in other geometrical configurations provided that both the housing and the cartridge are of the same complementary configuration. The specific orientation and number of access openings in the housing and in the respective cartridges may be varied from that disclosed in the drawing, provided that the openings in the housing and the cartridges are oriented relative to one another to provide alignment of at least one housing opening and at least one cartridge opening to permit termit access to the cartridge through the housing. Moreover, although the respective openings in the housing and the cartridges preferably are of the same size and are in exact registration or alignment when a cartridge is received in its operational position within the housing, it is only necessary that a portion of at least one housing opening be aligned with a portion of at least one cartridge opening to provide access to the cartridge through the housing.

In the embodiments of the invention discussed above, a bait material is disposed within a cartridge, and the cartridge is removably received within a fixedly positioned outer housing. The relative dimensions of the cartridge and the bait material therein may be selected so that the inner sidewalls of the cartridge are contiguous with the outer surface of the bait material. In the alternative, the dimensions may be selected such that a clearance or cavity is defined between the inner sidewalls of the cartridge and the outer surface of the bait material. In the latter alternative, a greater surface area of the bait within the cartridge is made available for termite feeding to recruit termites in large numbers and induce bait occupation and compact grouping of termites in the cavity defined between the bait and cartridge walls. This can be accomplished by different means, as for example, recessing the outer surface of the bait a predetermined distance (e.g., 3/32") from the inner sidewalls of the cartridge, or arranging the bait in a spiral configuration within the cartridge contiguous with the inner surface of the cartridge proximate to the openings defined therein. Additionally, the cartridge and the outer housing may be relatively dimensioned such that a gap or cavity is defined between the outer surface of the cartridge walls and the inner surface of the housing to provide areas for termite grouping proximate to the bait.

It is further within the scope of the invention to provide a block or solid bait material removably received within the outer housing but not contained within a cartridge. The bait may define openings aligned with the openings in the outer fixed housing when the bait is fully received within the housing to induce termite feeding, or the bait may be devoid of such openings. Moreover, the solid bait material may be received in the housing contiguous with the inner perforated sidewalls of the housing, or the bait may be configured to defined cavities or gaps between the outer surface thereof and the inner sidewalls of the housing to result in the advantages discussed above.

Further modifications and variations within the scope of the present invention will become apparent to those skilled in the art. Accordingly, the embodiments discussed herein are intended to be illustrative only, and not restrictive of the scope of the invention, that scope being defined by the following claims and all equivalents thereto.

We claim:

1. A method of detecting and controlling termite infestation, said method comprising the steps of:
   fixedly positioning a housing having at least one opening defined therein relative to a target area to be monitored for termite presence,
   removably inserting a first cartridge having at least one opening defined therein into said housing such that said opening in said housing is at least partially aligned with said opening in said first cartridge for inducing termite feeding in said first cartridge and for providing access into said first cartridge through said aligned openings in said housing and said cartridge, and
   removing said first cartridge from said housing to inspect said first cartridge for termite activity therein.

2. The method as claimed in claim 1 wherein said first cartridge is at least in part transparent.

3. The method as claimed in claim 1 including the steps of:
   removably inserting a second cartridge having at least one opening defined therein into said housing such that said opening in said second cartridge is at least partially aligned with said opening in said housing if termite activity is detected in said first cartridge.

4. The method as claimed in claim 3 wherein said first cartridge includes a non-toxic termite bait, and said second cartridge includes a termite pesticide-containing bait.

5. The method as claimed in claim 4 wherein said target area is terrain, said step of fixedly positioning said housing relative to said target area including the step of implanting at least a portion of said housing within said terrain.

6. The method as claimed in claim 4 wherein said target area is a wooden structure, said step of fixedly positioning said housing relative to said target area including the step of mounting a surface of said housing having said at least one opening defined therein adjacent to at least a portion of an outer surface of said wooden structure.

7. The method as claimed in claim 4 wherein said housing and said first cartridge each define a plurality of openings therein arranged in a corresponding pattern, said step of removably inserting said first cartridge into said housing including the step of substantially aligning said plurality of openings in said first cartridge with said corresponding plurality of openings in said housing.

8. The method as claimed in claim 7 wherein said second cartridge defines a plurality of openings therein corresponding to the orientation of said plurality of openings in said housing, said step of removably inserting said second cartridge into said housing including the step of substantially aligning said plurality of openings in said second cartridge with said corresponding plurality of openings in said housing.

9. The method as claimed in claim 7 including the step of providing said housing, said first cartridge, and said second cartridge in the same geometrical configuration.

10. The method as claimed in claim 4 wherein the inner width of said housing is substantially equal to the outer width of said first cartridge, said step of removably inserting said first cartridge including the step of inserting said first cartridge into said housing in close-fitting, contiguous relationship therewith.

11. The method as claimed in claim 4 wherein the inner width of said housing is substantially equal to the outer width of said second cartridge, said step of inserting said second cartridge including the step of inserting said second cartridge into said housing in close-fitting, contiguous relationship therewith.

12. A method of detecting and controlling termite infestation, said method comprising the steps of:
fixedly positioning a housing having at least one opening defined therein relative to a predetermined target area to be monitored for termite presence,
removably inserting a cartridge having at least one opening defined therein into said housing such that said opening in said housing is at least partially aligned with said opening in said cartridge for attracting termites to said cartridge and providing access into said cartridge through said aligned openings in said housing and said cartridge, said cartridge including both a non-toxic termite bait material and a pesticide-containing material, and
removing said cartridge from said housing to inspect said cartridge for termite activity.

13. The method as claimed in claim 12 wherein said target area is terrain, and the step of fixedly positioning said housing includes the step of implanting at least a portion of said housing in said terrain.

14. The method as claimed in claim 12 wherein said target area is an above-ground structure, and the step of fixedly positioning said housing includes the step of mounting said housing to at least a portion of an outer surface of said structure.

15. A system for monitoring and controlling termite infestation, said system including:
a housing fixedly positioned relative to a target area to be monitored for termite activity, said housing having at least one opening defined therein,
a first cartridge removably receivable within said housing, said first cartridge including a bait material for termites and having at least one opening defined therein, said opening in said first cartridge being oriented relative to said opening in said housing such that said respective openings in said housing and said first cartridge are at least partially aligned with each other when said first cartridge is received within said housing in a predetermined operational position,
a second cartridge removably receivable within said housing, said second cartridge including a pesticide-containing bait material and having at least one opening defined therein, said opening in said second cartridge being oriented relative to said opening in said housing such that said respective openings in said housing and said second cartridge are at least partially aligned with each other when said second cartridge is received in said housing in said predetermined operational position,
said first and second cartridge being selectively and interchangeably receivable within said housing.

16. The system as claimed in claim 15 wherein said first cartridge is at least in part transparent.

17. The system as claimed in claim 15 wherein at least a portion of said housing is fixedly implanted in terrain.

18. The system as claimed in claim 15 wherein at least a portion of said housing is fixedly mounted to an outer surface of an above-ground structure.

19. The system as claimed in claim 15 wherein said housing and said first and second cartridges are formed in the same geometrical configuration.

20. The system as claimed in claim 15 wherein said first and second cartridges are substantially identical in shape and dimension.

21. The system as claimed in claim 20 wherein the outer widths of said first and second cartridges are each substantially equal to the inner width of said housing such that said first and second cartridges are receivable within said housing in close-fitting relationship therewith.

22. An apparatus for monitoring and detecting termite infestation, said apparatus comprising:
a housing adapted to being fixedly positioned relative to a predetermined target area to be monitored for termite activity, said housing having at least one opening defined therein,
at least a first cartridge removably receivable within said housing, said first cartridge having at least one opening defined therein and oriented to be at least partially aligned with said opening in said housing when said first cartridge is received within said housing in a predetermined operational position, said first cartridge consisting of a non-toxic bait material for inducing termite feeding so that toxicant-containing cartridges are not received within said housing until after termite activity is actually detected in said non-toxic first cartridge.

23. The apparatus as claimed in claim 22 wherein said first cartridge is at least in part transparent.

24. An apparatus for monitoring and detecting termite infestation, said apparatus comprising:
a housing adapted to being fixedly positioned relative to a predetermined target area to be monitored for termite activity, said housing having at least one opening defined therein,
at least a first cartridge removably receivable within said housing, said first cartridge having at least one opening defined therein and oriented to be at least partially aligned with said opening in said housing when said first cartridge is received within said housing in a predetermined operational position, said first cartridge including a non-toxic bait material for inducing termite feeding,
a second cartridge removably receivable within said housing and interchangeable with said first cartridge in said housing, said second cartridge having at least one opening defined therein and oriented to be at least partially aligned with said opening in said housing when said second cartridge is received in said predetermined operational position within said housing, said second cartridge including a pesticide-containing termite bait material.

25. The apparatus as claimed in claim 23 wherein said housing and said first and second cartridges are formed in the same geometrical configuration and have the same physical dimensions, the outer widths of said first and second cartridges each being substantially equal to the inner width of said housing such that both said first and second cartridges are receivable in said predetermined operational position in said housing in close fitting relation to said housing.

26. A method of detecting and controlling termite infestation, said method comprising the steps of:

fixedly positioning a housing having at least one opening defined therein relative to a target area to be monitored for termite presence, removably inserting a bait material into said housing for inducing termite feeding, and removing said bait from said housing to inspect said bait for termite activity.

27. The method of claim 26 including the step of spacing said bait from said housing for defining at least one gap between the outer surface of said bait and the inner surface of said housing.

28. The method of claim 26 wherein the step of removably inserting the bait material includes the steps of enclosing the bait material within a cartridge having at least one opening therein and defining at least one gap between the outer surface of the bait and the inner surface of the cartridge.

29. The method of claim 26 wherein the step of removably inserting the bait material includes the steps of enclosing the bait material in a cartridge, and providing at least one gap between the outer surface of said cartridge and the inner surface of said housing.

30. A system for monitoring and controlling termite infestation, said system including:

a housing fixedly positioned relative to a target area to be monitored for termite activity, said housing having at least one opening defined therein, and a bait material consisting of a non-toxic substance removably received within said housing for termite feeding such that toxicant-containing substances are not received in said housing until after termite activity is actually detected in said non-toxic bait material.

31. The system as claimed in claim 30 wherein said bait material is dimensioned relative to said housing such that at least one gap is defined between the outer surface of said bait and the inner surface of said housing when said bait material is received within said housing.

32. The system as claimed in claim 30 further including a cartridge having at least one opening defined therein, said bait material being enclosed within said cartridge to define at least one gap between the inner surface of said cartridge and the outer surface of said bait material.

33. The system as claimed in claim 31 further including a cartridge having at least one opening therein, said bait material being enclosed within said cartridge, said cartridge being received within said housing to define at least one gap between the inner surface of said housing and the outer surface of said cartridge.

34. An apparatus for monitoring and detecting termite infestation, said apparatus comprising:

an outer housing adapted to being fixedly positioned relative to a predetermined target area to be monitored for termite activity, said outer housing having at least one opening defined therein.

an inner housing for removably holding at least a first cartridge therein, said inner housing being removably received with said outer housing, said inner housing having at least one opening defined therein and oriented to be at least partially aligned with said opening in said outer housing when said inner housing is received within said outer housing in a predetermined operational position, said inner housing being formed from two sections pivotally mounted together for selectively opening and closing said inner housing, said inner housing being removable from and insertable into said outer housing in a closed position, said inner housing adapted to be opened for inspection, removal, replacement or exchange of said cartridge therein when said inner housing is removed from said outer housing.

35. A method for monitoring and detecting termite infestation, said method including the steps of:

fixedly positioning an apertured outer housing relative to a predetermined target area to be monitored for termite activity, removably inserting an apertured inner housing enclosing a cartridge therein within said outer housing such that at least one aperture in said inner housing is at least partially aligned with at least one aperture in said outer housing, said inner housing being formed from two sections pivotally mounted to each other for opening and closing said inner housing, and selectively pivoting said two inner housing sections to open said inner housing for direct inspection of said cartridge enclosed therein when said inner housing is removed from said outer housing.

* * * * *